Feb. 13, 1934.                  T. LORD                    1,947,132
                                MOUNTING
                           Filed June 11, 1931
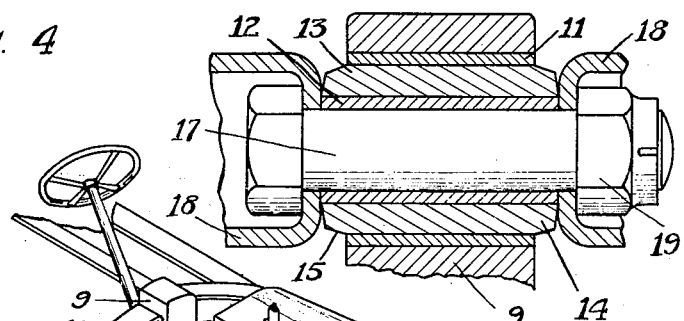
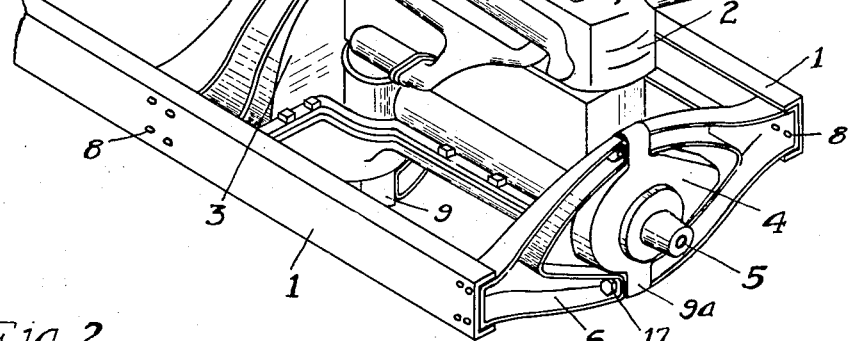
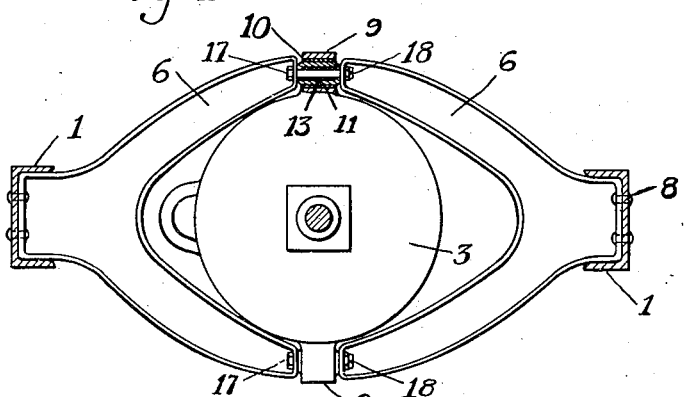
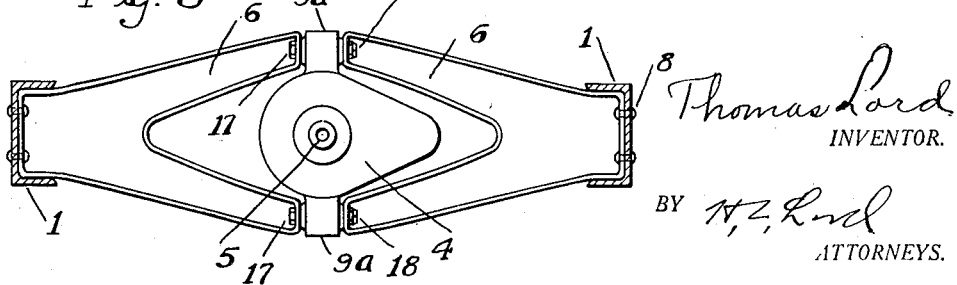

UNITED STATES PATENT OFFICE 1,947,132

MOUNTING

Thomas Lord, Erie, Pa., assignor to Hugh C. Lord, Erie, Pa.

Application June 11, 1931. Serial No. 543,650

4 Claims. (Cl. 248—14.2)

The present invention is designed to improve mountings for rotating instruments having periodic vibrations, particularly such instruments as create these vibrations through torsional effect. As an example an automobile engine is subjected to impulses creating torque vibrations which are communicated to the frame and thence to the passengers which is objectionable. On the other hand, the engine is subjected to its gravity load which may be very greatly increased due to shocks incident to the movement of the machine. In the present invention I have provided mountings to absorb the vibrations arranged above and below the axis of the engine, particularly directly above and below and arranged these mountings to absorb the torque vibrations through shear on the rubber and to support the gravity load and shocks through direct stress on the rubber, preferably a tension stress. I preferably also permit a free shear movement for a limited range and arrest it within close limits. Preferably the engine is similarly mounted front and rear using the supports as cross members and using the mounting themselves in completing the cross members. Features and details of the invention will appear from the specification and claims.

A preferred embodiment of the invention is illustrated in the accompanying drawing as follows:—

Fig. 1 shows a perspective view of an automobile engine mounted in its frame.

Fig. 2 an elevation of the rear cross member with the mountings in place.

Fig. 3 a similar view of the front cross member with the mountings in place.

Fig. 4 an enlarged cross section of one of the mountings and its connections.

1 marks the side sills of the frame, 2 the engine, 3 the bell housing, 4 the gear case, and 5 the cranking extension of the engine. These are of usual construction. The two cross members are of exactly the same form with slightly different proportions to accommodate the parts supported. Each has a Y-shaped portion 6 which is flanged entirely around the portion giving it a continuous channel form. The outer ends of these Y-shaped members are so formed as to fit within the flanges of the side sills and are riveted to the side sills by rivets 8.

The bell housing, or, if preferred, the engine directly has extensions 9 at the top and bottom and the gear case, or if preferred the engine, proper, has extensions 9a at the top and bottom, these extensions being between the ends of the Y-shaped members. The projections are provided with horizontal cross perforations 10 and the mountings are placed in these perforations, the mountings being preferably of annular form with an outer member 11, an inner member 12 and an intervening portion 13 of rubber secured to the members 11 and 12 by vulcanization so that the rubber, due to its shrinkage in cooling, will be placed under tension.

The rubber preferably has an extension 14 projecting beyond the outer member 11, this extension having a bevel 15 of very slight taper and a face, or end bevel 16 adapted to engage an end wall 18 of a member 6. Preferably both ends of the mounting have this extended end which, for convenience, has been called a snubbing end. A bolt 17 extends through the inner member 12 and through the ends 18 and is clamped against the ends 18 by the action of a nut 19. It will be seen, therefore, that the member 12 with the bolts completes the trusses forming the cross members.

It will be seen that the torque forces and vibrations are sustained by the rubber in shear, the axis of the mountings being tangent to a circle around the axis of the engine. It will be noted that the gravity loads, or thrusts are direct on the rubber and the rubber is preferably so proportioned to the weight that the entire weight is carried by the tension side of the mounting so that the rubber carries the normal load in tension.

The projecting ends limit the oscillations due to torque vibration. This may be limited within as close dimensions as desired by reducing the space between the beveled end 16 and the end 18, or by varying the length of the end 14 and also by varying the taper 15. Through the variations of these parts the range of free vibration, or approximately free vibration may be controlled, as desired. In some instances it may be desirable to have the surface 16 in initial contact with the end 18 so that the free movement is very much reduced, but permits of sufficient movement to take, or absorb the vibrations which ordinarily are very minute.

It will be noted that the rubber in shear, that is, in an axial direction of the rubber mountings is very much softer than in a radial direction and that the gravity thrusts will be sustained by the mounting in substantially the same manner regardless of how far from the axis they may be placed. On the other hand, the effect of the torque reactions on the mountings may be varied by varying the distance radially that the mountings are placed from the axis. Thus by varying the radial distance of the mountings it is possible to vary the effective stiffness of the mounting responding to torque reactions and responding to gravity, or vertical reactions.

What I claim as new is:—

1. In an instrument mounting, an instrument having rotating elements producing torque vibrations; a support for the instrument comprising forked cross members, the forks extending above and below the axis of the instrument; and resilient mountings for the instrument secured to the instrument and the ends of the forks.

2. In an instrument mounting, an instrument having rotating elements producing torque vibrations; a support for the instrument comprising forked cross members, the forks extending above and below the axis of the instrument; and resilient mountings attached to the instrument and secured between the ends of the forks and forming a connection between the forks to complete the support.

3. In a mounting, an instrument having rotating elements producing torque vibrations; a support for the instrument comprising side members and forked cross members secured to the side members, the cross members extending above and below the axis of the instrument; resilient mountings attached to the instrument, each having an outer member, an inner member, and rubber secured to the inner and outer members; and a bolt extending through the inner member and secured to the fork ends.

4. In a mounting, an instrument having rotating elements producing torque vibrations; and supports comprising mountings for the instrument above and below the axis of the instrument with a preponderance of the mountings arranged more nearly adjacent to a vertical plane through the axis of the instrument than to a horizontal plane through the axis of the instrument and comprising tangentially extending surfaces and rubber between the surfaces and bonded thereto, the rubber being so disposed and associated with the surfaces to accommodate the torque thrusts in shear and the gravity thrusts by direct non-shear stress of the rubber.

THOMAS LORD.